UNITED STATES PATENT OFFICE.

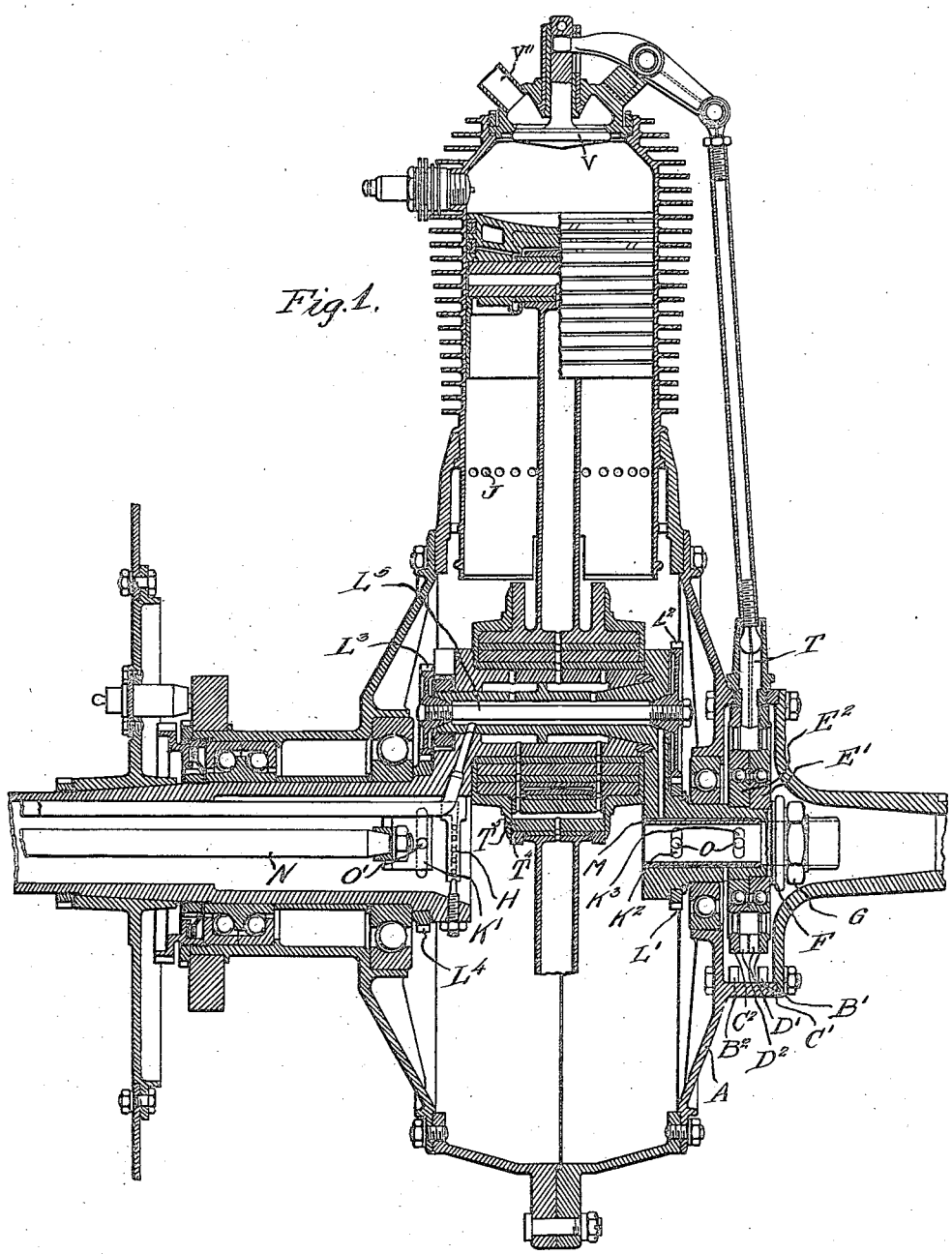

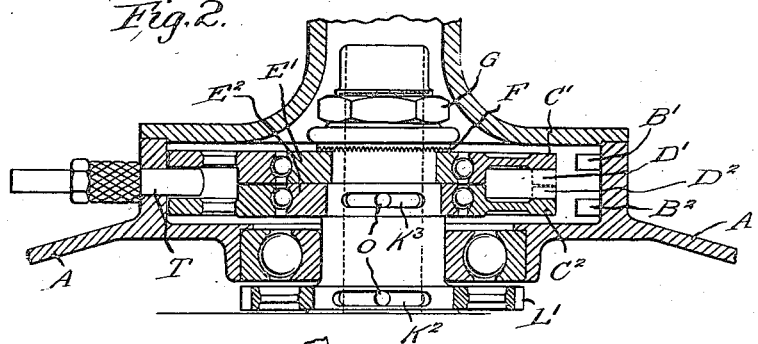
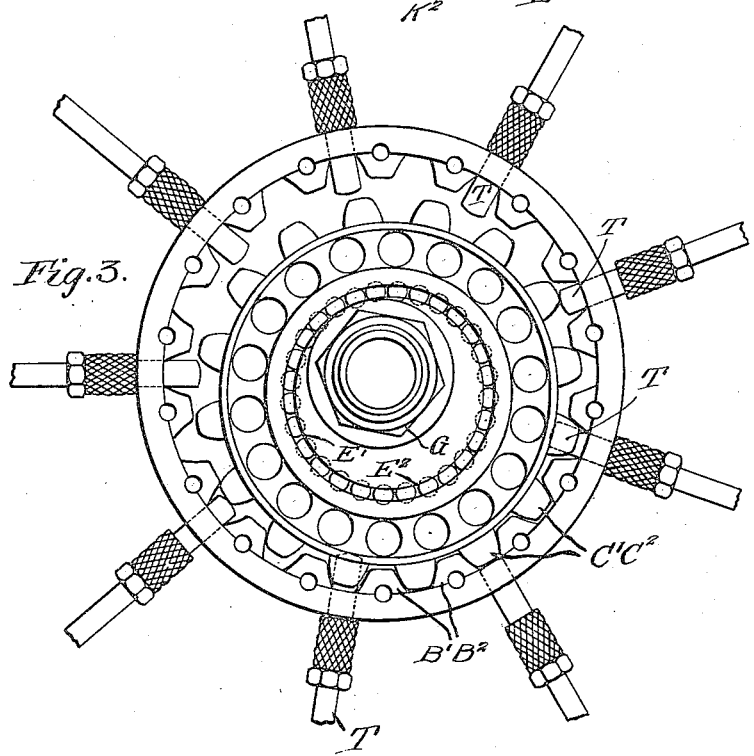

BATEMAN DAVID SCOTT, OF SALE, ENGLAND, ASSIGNOR TO THE GRESHAM FINANCE CORPORATION LIMITED, OF LONDON, ENGLAND, A CORPORATION OF GREAT BRITAIN.

VALVE-GEAR OF RADIAL-CYLINDER INTERNAL-COMBUSTION ENGINES.

1,256,833.

Specification of Letters Patent. Patented Feb. 19, 1918.

Application filed March 27, 1916. Serial No. 87,026.

*To all whom it may concern:*

Be it known that I, BATEMAN DAVID SCOTT, a subject of the King of Great Britain, and a resident of Hereford Cottage, Sale, Cheshire, England, have invented new and useful Improvements in the Valve-Gear of Radial-Cylinder Internal-Combustion Engines, of which the following is the specification.

This invention relates to that class of explosion motor or internal combustion engine having radial cylinders, and has for its object to provide a method of operating the valves of such engines, and provides moreover means for controlling the period of opening of the valves, and thereby the speed and power of the engine. The present invention provides means for each valve being opened for exhaust at the proper instant, and for each valve being held open during a portion of the induction stroke for admission of air to the cylinder. When any given valve has closed, the resulting vacuum in the corresponding cylinder is utilized to draw a saturated mixture from the carbureter through suitable ports in the cylinder, such mixture being too rich to be explosive, but mixed with the previously admitted air, forming an explosive mixture. After the mixture is compressed and fired, the cycle of operations in the cylinder is repeated. This improvement dispenses with all separate inlet valves together with their attendant mechanism, and permits the cylinders of radial explosion motors to be fired alternately. Any suitable or reasonable number of cylinders may be employed, and the engine may have either fixed or revolving cylinders.

I append drawings illustrating my invention as applied to a radial engine having nine revolving cylinders.

Figure 1 is a sectional view through the main crank shaft, crank case and one cylinder.

Fig. 2 is a section to a larger scale showing the valve operating gear.

Fig. 3 is an elevation of the valve operating gear, the two eccentrics being in the same angular position, corresponding with Fig. 2.

Figure 4:
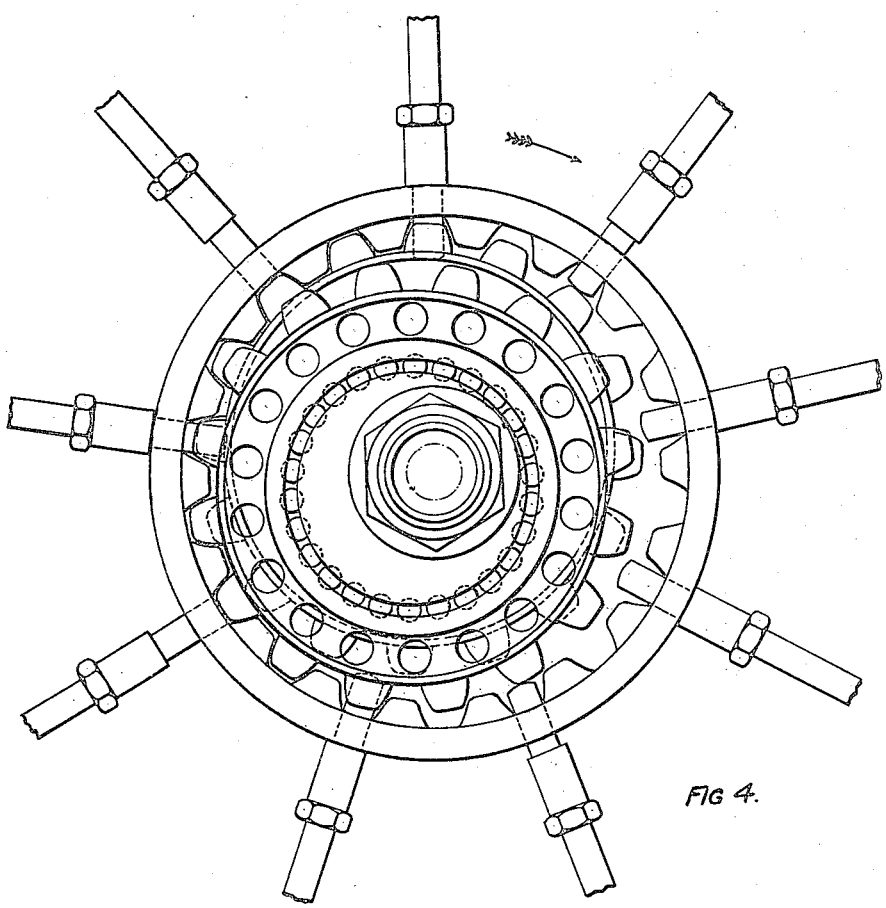
Fig. 4 is an elevation of the valve operating gear, showing the adjustable eccentric displaced 90 degrees from the fixed eccentric.

The arrangement of the cylinders, crank case, crank shaft, journal and thrust bearings do not form part of my present invention.

The crank case cover A which carries one of the main journal ball bearings for the crank shaft also carries two rings of teeth $B^1$ and $B^2$, thus forming two internal toothed wheels. In the drawings, the said teeth are shown integral with the crank case cover A, but the internally toothed wheels may be detachably fastened to the crank case cover. Engaging with the said internally toothed wheels are a pair of inner spur wheels $C^1$ and $C^2$ which revolve on ball bearings. Every fourth tooth of the spur wheels is extended laterally as shown by the dotted lines at $D^1$ and $D^2$. In the engine illustrated there are nine tappet rods (see Fig. 3) equally spaced and lying in the same plane, between the two rings of teeth $B^1$ and $B^2$. Alternate tappet rods T are operated in sequence by the lateral extensions $D^1$ and $D^2$ of the teeth of the inner wheels as aforesaid. Both ball bearings of the inner wheels have their inner races $E^1$ and $E^2$ eccentric to the crank shaft. One of the said inner races or eccentrics $E^1$ is fixed to the shaft, it may be initially adjusted relative to the shaft by means of the serrations F and the nut G. The serrated ring is keyed or castellated to the shaft, so that it cannot turn relative thereto, but may slide axially when being assembled. Thus the eccentric $E^1$ can be adjusted to its required position relative to the shaft within an angle corresponding to that of half the pitch of the serrations. The eccentric $E^1$ is timed to operate the valve V in each cylinder during the usual four-stroke cycle exhaust period. The other eccentric $E^2$ is given a "lag" which is variable under the engine load. In other words this variable eccentric is set to operate later than the eccentric $E^1$, and is adapted to hold open the exhaust valve during a portion of the inlet stroke for the admittance of cold air. When the valve V in either of the cylinders has closed, the resultant partial vacuum is utilized to draw a saturated inflammable mixture from the jet H into the cylinders at the end of the out or suction stroke, by way of the holes J, from the crank chamber, and after the mixture has been compressed and fired the cycle is repeated. The speed and power of the engine is controlled when working by the number of degrees the valves are allowed to remain open during the induction stroke. This is effected by a rotation of the eccentric $E^2$ through a certain arc.

To effect this, the crank shaft is slotted at K¹, K² and K³, the sleeve M and the toothed wheels L¹, L², L³, L⁴, and the shaft N being employed as shown. Pins O are used passing through the crank shaft to couple the wheels L¹ and the eccentric E² to the sleeve M. The shaft N is also coupled to the wheel L⁴ by means of the pin O¹ in like manner, and the wheels L² and L³ are coupled together by means of a light shaft L⁵ running through the crank pin, the latter being recessed on the inside for lubrication purposes. The said wheels are adapted to gear together, that is, the wheel L³ to the wheel L⁴, and the wheel L² to the wheel L¹, and it will be seen that by rotating the shaft N slightly either way (by mechanism not shown in the drawing) the eccentric E² is rotated through a certain number of degrees, and the times of closing the valves either early or late may be varied at will.

From the foregoing description, the cycle of operations in the cylinder and the times of opening and closing the valve V in an engine made according to my present invention, will be readily intelligible. Suppose the engine to be running at speed, and the piston at the top commencing the induction stroke. The valve V in the cylinder top will then be open to admit pure air and will not close until the piston has descended say 80 or 85 degrees. The valve then closes and no more pure air can enter. The piston continues to descend and creates a partial vacuum, which when the piston overruns the holes J allows a very rich mixture—too rich to fire of itself—to enter the cylinder. The air previously admitted and the rich mixture make an explosive mixture. The holes J are only uncovered by the piston for a very short period and are closed at the beginning of the compression stroke, and the mixture now being highly explosive is fired in the usual way when the charge is fully compressed. The stroke is very long in proportion to the bore so that the terminal pressure shall not be sufficient to cause a "blow back" when the holes are uncovered by the piston on the explosion stroke, also the exhaust valve is already open before the holes are uncovered. At every engine speed there is a definite number of degrees that the valve V should remain open, and this is found by varying the position of the movable eccentric by means of the hand gear mentioned. At starting, the exhaust valve may only remain open 10 degrees past the top center; that is to say 10 degrees on the induction stroke in order to obtain the necessary amount of suction from the jet. Running top speed it may be necessary to hold it open for as much as 100 or 110 degrees.

What I do claim as my invention and desire to secure by Letters Patent is:—

1. The combination with a radial cylinder internal combustion engine, of a valve gear comprising a pair of spur wheels mounted eccentrically on the crank shaft at different angles in gear with a pair of internally toothed wheels fixed concentrically to the crank case, and radial valve tappets one for each cylinder operated by extensions on the said spur wheels, the extensions on one of the said spur wheels determining the time of opening of the valves, and the extensions on the other determining the time of closing.

2. The combination with a radial cylinder internal combustion engine, of a valve gear comprising radially disposed valve tappets one for each cylinder, and operating means for said tappets including a pair of internally toothed wheels fixed with relation to the cylinders of the engine, and a pair of gear wheels mounted eccentrically on the crank shaft in gear with said fixed toothed wheels and actuating the valve tappets, one of said gear wheels controlling the time of opening of the valves, and the other of said gear wheels controlling the time of the closing of the valves.

3. The combination with a radial cylinder internal combustion engine, of a valve gear comprising radially disposed valve tappets, one for each cylinder, and operating means for the tappets including a pair of internally toothed wheels fixed with relation to the engine cylinders, and a pair of gear wheels mounted eccentrically on the engine crank shaft in gear with said fixed toothed wheels, each of said wheels being provided with projections to engage and actuate the tappets, one of said gear wheels controlling the time of opening of the valves, and the other of said gear wheels controlling the time of the closing of the valves.

4. The combination with a radial cylinder internal combustion engine, of a valve gear comprising radially disposed valve tappets, one for each cylinder, and operating means for the tappets including a pair of internally toothed wheels fixed with relation to the engine cylinder, a pair of gear wheels mounted eccentrically on the engine crank shaft in gear with said fixed toothed wheels, each of said wheels being provided with lateral projections to engage and actuate the tappets, one of said gear wheels controlling the time of opening of the valves, and the other of said gear wheels controlling the time of the closing of the valves, and means for varying the setting of one of the eccentrics of the said toothed wheels whereby the time of closing of the valves may be varied at will.

5. The combination with a radial cylinder internal combustion engine, of a valve gear comprising a pair of internally toothed wheels fixed with relation to the engine cylinders and spaced from each other, valve tappers disposed radially intermediate said toothed wheels, and a pair of gear wheels mounted eccentrically on the crank shaft in gear with said fixed toothed wheels, each of said gear wheels being provided with projections extending laterally into the space between the said fixed toothed wheels to engage and operate the valve tappets, one of said gear wheels controlling the time of opening of the valves, and the other of said gear wheels controlling the time of the closing of the valves.

6. The combination with a radial cylinder internal combustion engine, of a valve gear comprising radially disposed valve tappets, one for each cylinder, and operating means for the tappets including a pair of internally toothed wheels fixed with relation to the engine cylinder, and a pair of gear wheels mounted eccentrically on the crank shaft in gear with the said fixed toothed wheels and operating the valve tappets, one of said gear wheels controlling the time of opening of the valves, and the other of said gear wheels controlling the time of closing of the valves, and means for varying the setting of one of the eccentrics of the said toothed wheels whereby the time of closing of the valves may be varied at will.

BATEMAN DAVID SCOTT.

Witnesses:
ERNALD SIMPSON MOSELEY,
MALCOLM SMETHURST.